3,041,057
DROSSING SYSTEM FOR GALVANIZING KETTLES
William S. Pearson, 5821 Clear Spring Road, Baltimore 12, Md.
Filed Dec. 8, 1958, Ser. No. 778,777
9 Claims. (Cl. 266—1)

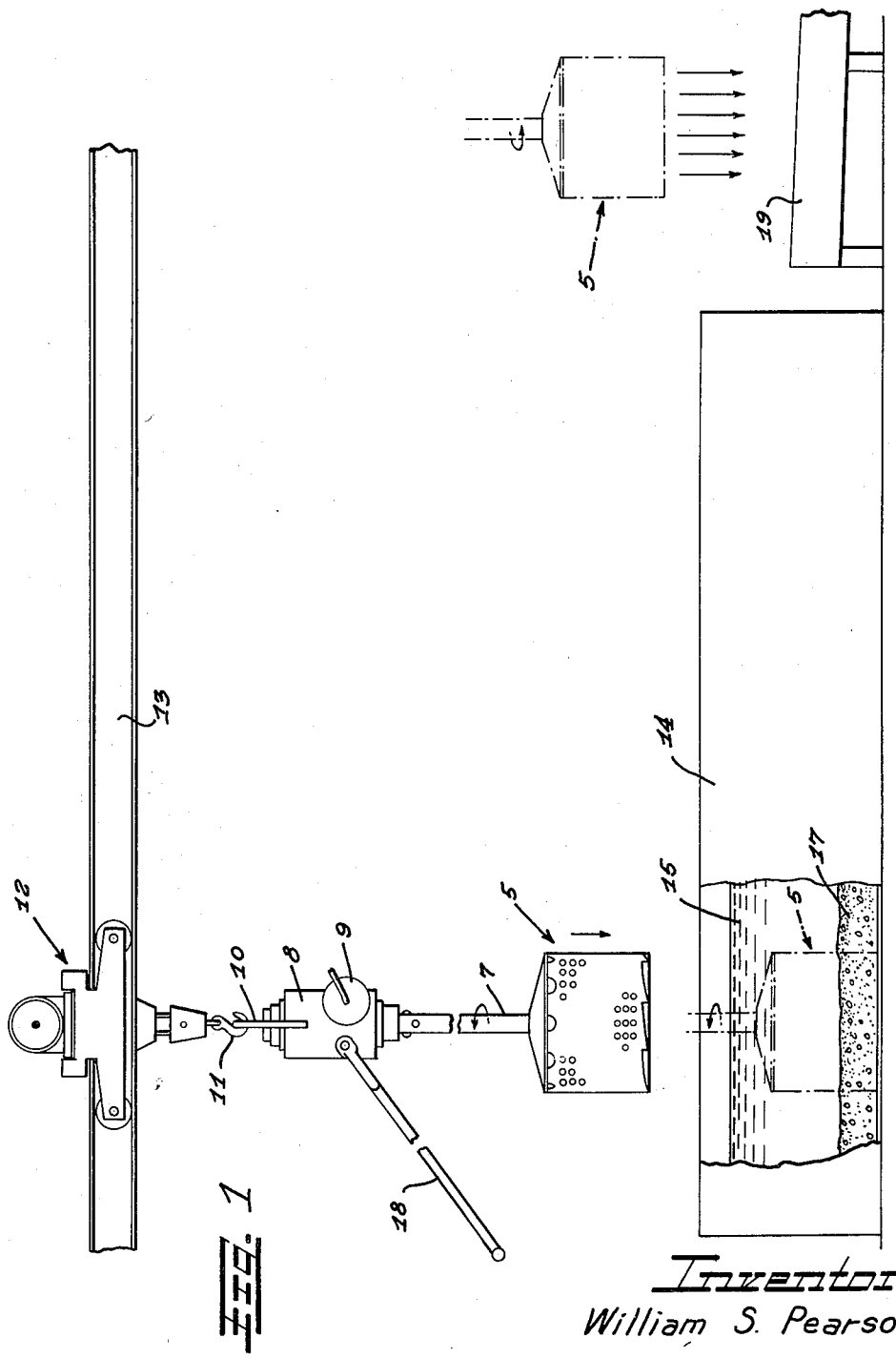
Inventor
William S. Pearson

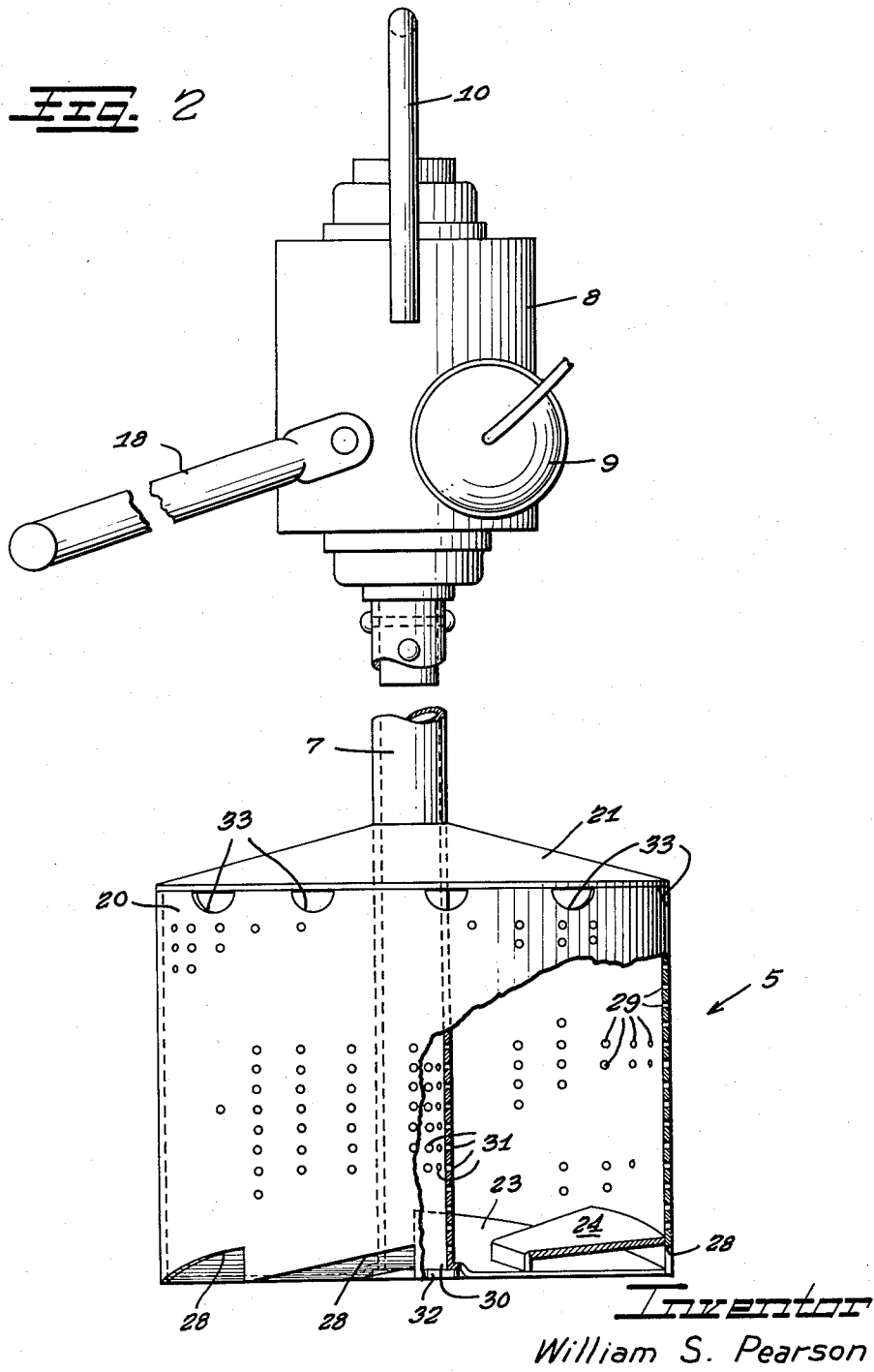

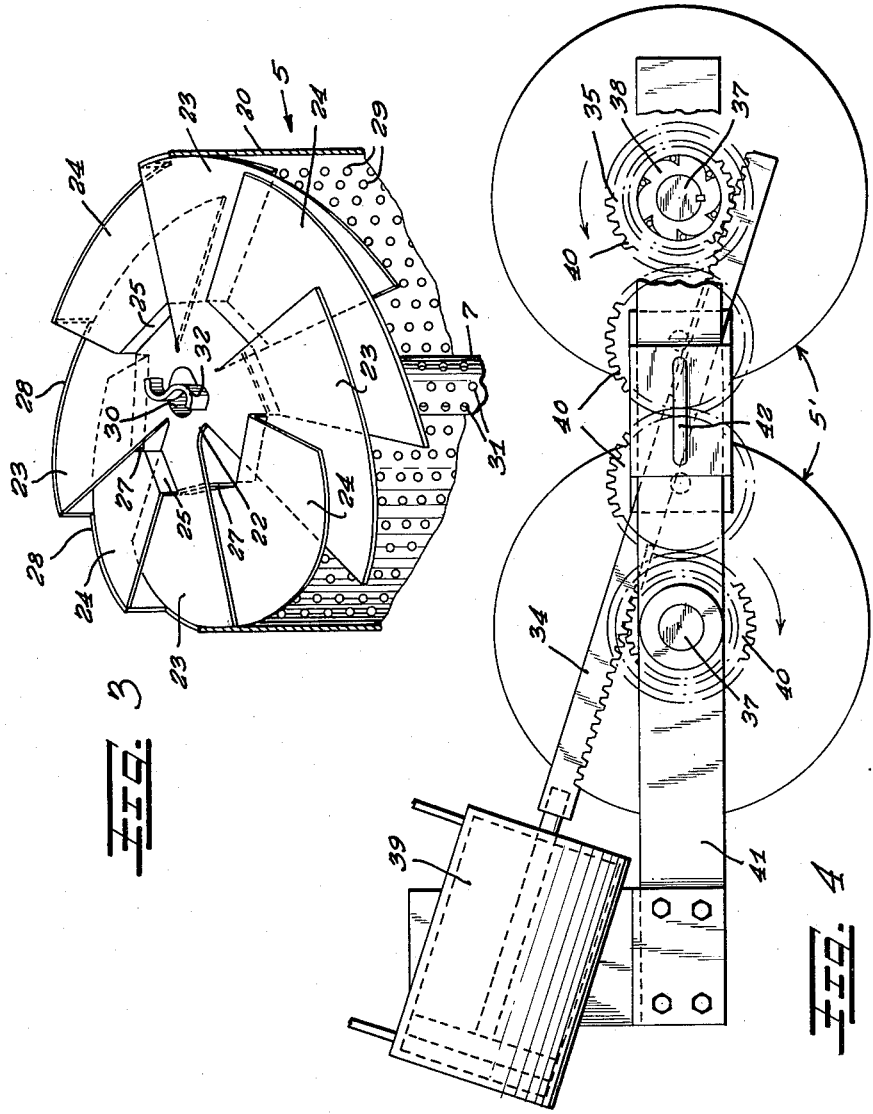

The present invention relates to improvements in removal of dross from zinc pots or kettles and more particularly concerns such dross removal without lengthy shutdown or production time losses with respect to any zinc kettle which must be cleansed of dross.

Heretofore removal of the iron laden dross which settles to the bottom of galvanizing kettles, also often referred to as zinc pots, has generally required as much as an eight hour shutdown per week of operation.

Since the dross is a heavy precipitate on the bottom of the kettle with molten zinc thereover and the dross as removed has a substantial amount of the molten metal mixed with it, there is a problem of separating the free or molten metal from the dross. In order to effect such separation efficiently, it must be accomplished while the zinc is still in a molten state. Unless the separating equipment is heated, loading thereof with dross removed from the kettle must be accomplished in large enough quantity and with sufficient speed to prevent chilling of the metal beyond the point of separation. Such accomplishment has been difficult heretofore.

It is accordingly an important object of the present invention to provide an improved system for removing dross from kettles of molten metals such as zinc kettles or pots rapidly to minimize shutdown time and in large enough quantities to enable efficient separation of molten metal from the dross.

Another object of the invention is to provide an efficient dross removal device which will gather directly from the bottom of the kettle under the molten metal a large quantity of dross with minimum molten metal removed with the dross.

A further object of the invention is to provide novel means for removing dross from kettles of molten metal operable by lowering the same down through the molten metal for gathering up the dross from the bottom of the kettle by sizable batches.

Other objects, features and advantages of the present invention will be readily apparent from the following detailed description of certain preferred embodiments thereof taken in conjunction with the accompanying drawings, in which:

FIGURE 1 is a more or less schematic view of a drossing system according to the present invention;

FIGURE 2 is an enlarged fragmental and partially sectional view of the dross removing device;

FIGURE 3 is a partially sectional bottom isometric view of the device; and

FIGURE 4 is a more or less schematic top plan view of a multiple unit dross removing device according to the invention.

As shown in FIGURE 1, a drossing drum 5 embodying features of the invention is rotatably supported by a shaft 7 depending from a gear reduction housing and drive mechanism 8 on which is mounted a suitable driving motor 9 which may be of any preferred type but may conveniently be an electrical motor of reversible type suitably controlled by switch means (not shown) thereon or at a remote point. On the drive mechanism housing is a bail 10 engageable by a crane hook 11 of an overhead crane 12 riding on rail structure 13.

By means of the crane 12, the drossing mechanism can be maneuvered into various positions over a zinc pot or kettle 14 within which is a molten mass of the metal 15 maintained in any preferred manner in a continuously molten state. In the bottom of the kettle a mass of dross 17 collects as a precipitate during use of the kettle in galvanizing.

For convenience in manipulating the device a handle 18 of sufficient length is pivotally connected at one end to the housing of the drive mechanism structure 8 so that a workman can guide and control movements and operation of the drossing drum 5 from the sides of the kettle 14.

Construction of the drossing drum 5 is such that it can be submerged in the molten metal 15 until the drum drops to the bottom of the kettle 14 or at least into the deposit of dross sludge 17 in the bottom of the kettle substantially as shown on comparison of the full line and phantom line positions shown at the left side of FIGURE 1. After the drossing drum 5 has been loaded with dross, it is raised from the kettle 14 and transported by means of the overhead crane 12 to a receiving device 19 over which the drum is suspended as shown at the right side of FIGURE 1 and the dross load dumped therefrom into the receiving device 19. The receiver 19 may be part of a separator installation wherein free molten metal that may remain with the load of dross is separated for return to the kettle 14.

As shown herein, in FIGURES 2 and 3, the drossing drum 5 includes a cylindrical shell retaining wall 20 of substantial diameter attached at its upper edge to a sloping preferably low pitch frusto-conical roof plate 21 centrally secured to the shaft 7 which projects downwardly therethrough and is preferably of hollow tubular construction.

On its lower end, the drum casing 20 carries and is attached to a loading auger structure and dross supporting floor including a plate 22 sub-divided into a plurality, here four, preferably individually flat but uniformly relatively spirally tilted dross-shovel vanes 23 which have their respective adjacent edges relatively axially offset by virtue of the low pitch tilting of the vanes. Partially interleaved in uniformly spaced relation in preferably about half underlapping the exposed underside of the upwardly tilted portion of one of the auger vanes 23 and similarly overlapping the upper side of the downwardly tilted portion of the immediately adjacent auger vane 23 at each separation between the auger vanes 23, is a supplementary and complementary individual auger vane plate 24. All of the auger vanes 23 and 24 are peripherally preferably secured rigidly to the inner diameter of the cylindrical casing 20. At their inner perimeters, the supplementary vanes 24 have respectively upwardly and downwardly directed attachment and spacer flanges 25 and 27 secured to the opposing faces of the vanes 23. This provides a thoroughly rigid structure wherein all of the vanes 23 and 24 are in mutually reinforcing and supporting relation and with the leading edges provided by the downwardly tilted portions of the several vanes defining with the vanes immediately thereabove entry mouths receptive of dross precipitate as the drossing drum 5 is rotated to drive the leading edges of the vanes in auger-like boring relation down into the mass 17 of dross in the kettle. Due to the low pitch angularity of the several vanes 23 and 24 to a horizontal plane across the bottom of the drum 5, as visualized in FIGURES 2 and 3, and thus low angle of repose for the slushy dross slurry, once the dross has been scooped into the drum it will remain therein at least as long as the drum continues to rotate in the direction of the leading edges of the vanes, thereby resisting reverse flow of the dross.

In order to facilitate the boring, scooping action of the several vanes, the lower margin of the cylindrical drum wall is notched out as indicated at 28 conformable to the leading end portions of the several vanes.

In order to permit the fluid metal to drain off from the relatively heavier and more sluggish dross, the cylindrical wall 20 is preferably provided with a pattern of small drain holes 29. These holes may be distributed in a uniform pattern over the entire surface of the drum wall 20 and are of a small enough diameter to permit liquid metal especially on top of the mass of dross scooped into the drum to drain off rather freely but resist flowing out of the relatively more sluggish mass of dross.

Drainage of molten metal from the dross is further facilitated by having the hollow shaft 7 extend down entirely through the center of the drum 5 and with the lower end of the shaft secured to the bottom plate 22 and providing a drainage opening 30 centrally therethrough. A uniform preferably all-over pattern of small drain holes 31 in the wall of the shaft 7 within the drum enables liquid metal to flow therethrough and down the interior of the tube and out of the drain opening 30.

To keep the drain opening 30 reasonably clear of obstruction or plugging from dross as the drum is driven down into the mass of dross, a preferably generally S-shaped deflector 32 is provided across the opening 30 and as the drum rotates this deflector deflects the dross away from the opening and keeps the opening clear for drainage.

In order to enable maximum loading of the drossing drum 5 without build up of head pressure as the load of dross nears the top closure or roof plate 21, a circumferential, spaced series of spill-over port holes 33 is provided in the upper margin of the drum cylinder 20. These spill-over ports 33 are substantially larger than the small drainage perforations 29 so as to permit fairly free run-off of fluid metal. Thereby, substantially complete freedom from back pressure is maintained at all times within the drum during loading of the drum up to its maximum capacity. In addition, due to their individual relatively large size and their aggregate flow area, the ports 33 provide over-load relief, since even the dross can flow out of such ports when the load level of dross reaches the ports, thereby avoiding the development of back pressure in the dross load which might force the dross to exude from the openings between the shovel blade vanes 23 and 24 during transportation of the drossing drum from the kettle to the discharge point.

In operation, the drossing device is maneuvered into the desired position over the kettle 14 and the drossing drum 5 is actuated to revolve at suitable slow speed such as about six revolutions per minute in the direction indicated by the revolution arrows in FIGURE 1 to advance the scooping edges of the tilted shovel vanes 23 and 24. For the convenience of the operator, means for controlling the motor 9 may be carried by the handle 18 in any suitable manner. The revolving drossing drum 5 is then lowered into the molten metal 15, as indicated by the vertical directional arrow in FIGURE 1, the shovel vane blades 23 and 24 cutting down through the mass of dross 17 and scooping the dross into the drum until the lower end of the drum scrapes the bottom of the kettle. Where, as shown, the layer of dross 17 is thinner than the vertical capacity of the drossing drum 5, the drum, rotating continuously, may be raised and redirected into the dross until a full load is contained within the drum. For final clean up, the rotating drum 5 can be dragged around or back and forth over the bottom of the kettle to gather up remnants of dross that may have been missed or which may have settled back down onto the bottom after agitation of the fluent mass during the major drossing activity of the drum. In this final clean up, especially, the lower marginal peripheral notches 28 facilitate entry of the dross into the shovel mouths of the device.

After the drossing drum 5 has picked up a load of dross, it is raised out of the kettle 14 while continuously rotating in the scoop-up or shovelling direction whereby to impose an inertia block coupled with normal frictional resistance and angle of repose of the dross within the drum for retaining the dross against spilling from the mouth openings between the overlapping shovel blades, while the drum is transported to an unloading station or position such as over the receiving member 19. At the unloading point, the drum 5 may be suddenly stopped so that the relatively slushy mass of dross within the drum tending by inertia to continue revolving will spill from the shovel mouth openings. Accelerated discharge of the dross can be effected by reverse rotation of the drum 5 as indicated by the rotational arrow at the right side of FIGURE 1. Such counter-rotation should be at relatively slow speed to avoid centrifugal splatter and just sufficient to promote downward spilling of the discharged load of dross as indicated by the vertical directional arrows at the right side of FIGURE 1.

Although connection of the drossing device to the overhead crane 12 may be such as to hold the drive mechanism 8 against torque-induced counter-rotation relative to the drum 5 during loading or co-rotation during unloading, the long handle 18 serves this purpose very well due to its long leverage advantage and affords substantial freedom and facility for maneuvering the device by the person in control.

During withdrawals of the drum 5 from the mass of molten metal 15, the imperforate sloping surfaced top 21 serves as a deflector canopy diverting the molten metal around the drum and preventing washing of the dross out of the load within the drum.

Although the motor 9 may be a reversible type so as to effect rotation of the drum 5 in either direction for the generally screw auger action of the tilted shovel blades and then the counter-revolution unloading movement of the drum, where a one-way motor, either electrical or fluid driven, is used the operating mechanism 8 may be equipped with suitable brake mechanism to effect the sudden unloading halt of the drum, the handle 18 being relied upon to impart follow-up jarring or torque to the drum to promote discharge slippage of the dross from the bottom of the drum.

If preferred, a plurality of drossing drums 5' (FIG. 4) may be mounted to provide a duplex unit or otherwise multiplex unit. Construction and general operation of the drossing drums 5' in other respects may be the same as described in connection with the single unit drum 5. For torque compensation or neutralization, the multiplex unit has the drums 5' arranged to rotate operatively in opposite directions.

Although the multiplex drum unit may provide individual driving means for each of the drums 5', common driving means may be utilized as shown more or less schematically comprising a double rack 34 meshing with respective driving pinion gears 35 releasably coupled with associated drum carrying rotary shafts 37 in each instance by one-way clutch mechanism 38. Driving reciprocations of the rack 34 are effected by a suitable motor 39 connected to one end thereof and shown as comprising a pneumatic or hydraulic fluid actuated cylinder and piston motor. Interlocking the motion of both of the drums 5' may be a train of gears 40. A suitable frame structure 41 supports the driving mechanism and the drum shafts 37 and also has thereon suitable means such as a bail 42 by which the unit can be handled by means of an overhead crane.

Although the multiplex unit of FIGURE 4 may be supplied with a handle to assist in maneuvering the same, it may be operated entirely from the overhead crane by which it is transported.

It will be understood that modifications and variations may be effected without departing from the scope of the novel concepts of the present invention.

I claim as my invention:

1. In a batch drossing device of the character described constructed and arranged to be lowered into and lifted out of a molten metal kettle having a precipitate of dross on its bottom, an auger-like shovel structure, a vertical central hollow shaft rotatably supporting said shovel structure, and opening at its lower end, means for lowering and lifting and rotating the shaft and thereby the shovel structure for shovelling dross to the upper side of the shovel structure, and receptacle means coactive with the upper side of the shovel structure to retain a mass of dross as a botch for transportation from a molten metal kettle to a discharge point beyond the kettle, said receptacle means having a top closure providing a deflector to prevent washing out of dross from the receptacle during lift out of the shovel and receptacle from a body of molten metal, said receptable means and said shaft providing fluid metal escape openings small enough to resist escape of dross from within the receptacle means.

2. In a drossing unit, a perforated hollow drum, a rigid bottom plate on the drum subdivided into a plurality of tilted shovel vanes providing scoop openings therebetween, auxiliary vanes extending through said openings and connected in spaced overlapping relation to the bottom plate vanes, all of said vanes having leading edges directed in a common rotary direction and being operable on rotation of the drum within a body of molten metal having dross precipitate therein to shovel the dross precipitate into the drum, the vanes being disposed in low pitch angularity to a horizontal plane across the bottom of the drum and thus the angle of repose of the vanes being such as to retain a mass of dross within the drum agains discharging from the shovel openings defined by the vanes especially while the drum continues to rotate in the scooping direction of the vanes but such angle being sufficient to enable discharge of the dross by sliding therefrom and down the incline of the vanes by gravity when the drum is stationary or rotated in reverse to the scooping direction of the vanes.

3. In a drossing drum structure, a hollow perforated drum having a scooping shovel bottom structure, a central tube within the drum and opening through the bottom shovelling structure, said tube being perforated for liquid metal drainage therethrough auxiliary to liquid drainage through the perforations in the drum, and an imperforate deflector top on said drum.

4. In a drossing drum structure, a hollow perforated drum having a scooping shovel bottom structure, a central tube within the drum and opening through the bottom shovelling structure, said tube being perforated for liquid metal drainage therethrough auxiliary to liquid drainage through the perforations in the drum, and an imperforate deflector top on said drum, said drum having a circumferential spaced series of spill over ports in the upper margin thereof.

5. In a rotary drossing drum structure, a hollow perforated drum having a scooping shovel bottom structure adapted to scoop dross from the bottom of a molten metal kettle in which the drum is immersed and rotated, a central tube within the drum and opening through the bottom shovelling structure, said tube being perforated for liquid metal drainage therethrough auxiliary to liquid drainage through the perforation in the drum as the drum fills with dross, and an imperforate deflector top on said drum, said shovel bottom structure having at the opening from said central tube a deflector for deflecting dross away from such opening as the drum rotates so as to keep the opening clear for drainage of liquid metal from the tube.

6. In a drossing unit, a hollow drum, a rigid bottom on the drum subdivided into a plurality of tilted shovel vanes providing scoop openings therebetween, said vanes being disposed in at least partially overlapping relation, all of said vanes having leading edges directed in a common rotary direction and being operable on rotation of the drum within a body of molten metal having dross precipitate therein to shovel the dross precipitate into the drum, the vanes being disposed in low pitch angularity to a horizontal plane across the bottom of the drum and thus the angle of repose of the vanes being such as to retain a mass of dross within the drum against discharging from the shovel openings defined by the vanes especially while the drum continues to rotate in the scooping direction of the vanes but such angle being sufficient to enable discharge of the dross by sliding therefrom and down the incline of the vanes by gravity when the drum is stationary or rotated in reverse to the scooping direction of the vanes.

7. In a drossing drum structure, a hollow perforated drum having a scooping shovel bottom structure, a central tube within the drum and opening through the bottom shovelling structure, said tube being perforated for liquid metal drainage therethrough auxiliary to liquid drainage through the perforations in the drum, and an imperforate deflector top on said drum, said scooping shovel bottom structure comprising a plurality of tilted shovel vanes provided scoop openings therebetween, all of said vanes having leading edges directed in a common rotary direction and being operable on rotation of the drum within a body of molten metal having dross precipitate therein to shovel the dross precipitate into the drum, the vanes being disposed in low pitch angularity to a horizontal plane across the bottom of the drum and thus the angle of repose of the vanes being such as to retain a mass of dross within the drum against discharging from the shovel openings defined by the vanes especially while the drum continues to rotate in the scooping direction of the vanes but such angle being sufficient to enable discharge of the dross by sliding therefrom and down the incline of the vanves by gravity when the drum is stationary or rotated in reverse to the scooping direction of the vanes.

8. In a drossing unit, a hollow drum, a rigid bottom on the drum subdivided into a plurality of tilted shovel vanes providing scoop openings therebetween, said vanes being disposed in at least partially overlapping relation, all of said vanes having leading edges directed in a common rotary direction and being operable on rotation of the drum within a body of molten metal having dross precipitated therein to shoved the dross precipitate into the drum, the vanes being disposed in low pitch angularity to a horizontal plane across the bottom of the drum and thus the angle of repose of the vanes being such as to retain a mass of dross within the drum against discharging from the shovel openings defined by the vanes especially while the drum continues to rotate in the scooping direction of the vanes but such angle being sufficient to enable discharge of the dross by sliding therefrom and down the incline of the vanes by gravity when the drum is stationary or rotated in reverse to the scooping direction of the vanes, said drum having a rotatable supporting shaft with which the drum is rotatably attached to be rotated by the shaft, means rotatably supporting said shaft, and means for transporting said shaft rotating means, said shaft rotating and supporting means having a manipulating handle thereon projecting laterally therefrom, and pivoted thereon, so that a workman can guide and control movements and operation of the drossing drum with respect to the zinc kettle.

9. In a drossing unit, a hollow drum, a rigid bottom on the drum subdivided into a plurality of tilted shovel vanes providing scoop openings therebetween, said vanes being disposed in at least partially overlapping relation, all of said vanes having leading edges directed in a common rotary direction and being operable on rotation of the drum within a body of molten metal having dross precipitate therein to shovel the dross precipitate into the drum, the vanes being disposed in low pitch angularity to a horizontal plane across the bottom of the drum and thus the angle of repose of the vanes being such as to retain a mass of dross within the drum against discharging from the shovel openings defined by the vanes especially while the drum continues to rotate in the scooping direction of the vanes but such angle being sufficient to enable discharge of the dross by sliding therefrom and down the incline of the vanes by gravity when the drum is stationary or rotated in reverse to the scooping direction of the vanes, the drum having in its lower end notches providing side openings generally registering with the leading edge portions of said vanes to enable entry of dross to the vanes when the drum is moved horizontally over the kettle bottom.

References Cited in the file of this patent

UNITED STATES PATENTS

| | | |
|---|---|---|
| 890,764 | Geare | June 16, 1908 |
| 1,179,669 | Siepmann | Apr. 18, 1916 |
| 1,401,994 | Lockley | Jan. 3, 1922 |
| 1,840,946 | Hall | Jan. 12, 1932 |
| 2,886,309 | Derham | May 12, 1959 |

FOREIGN PATENTS

| | | |
|---|---|---|
| 26,968 | Sweden | May 29, 1909 |